(12) United States Patent
Kanemoto et al.

(10) Patent No.: US 8,606,614 B1
(45) Date of Patent: Dec. 10, 2013

(54) HARDWARE/SOFTWARE AND VENDOR LABOR INTEGRATION IN PIPELINE MANAGEMENT

(75) Inventors: Michael W. Kanemoto, Lawrence, KS (US); Matthew E. Perkins, Pleasant Hill, MS (US); Margaret J. Knauth, Overland, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1911 days.

(21) Appl. No.: 11/403,652

(22) Filed: Apr. 13, 2006

(51) Int. Cl.
*G06Q 10/00* (2012.01)
(52) U.S. Cl.
USPC ................ 705/7.23; 705/7.13; 705/7.17
(58) Field of Classification Search
USPC ................................ 705/7.13, 7.23, 7.17
See application file for complete search history.

(56) References Cited

U.S. PATENT DOCUMENTS

| | | | |
|---|---|---|---|
| 5,408,663 A | | 4/1995 | Miller |
| 5,619,695 A | | 4/1997 | Arbabi et al. |
| 5,907,490 A | | 5/1999 | Oliver |
| 5,953,707 A | * | 9/1999 | Huang et al. ............... 705/7.25 |
| 6,032,121 A | | 2/2000 | Dietrich et al. |
| 6,216,109 B1 | | 4/2001 | Zweben et al. |
| 6,519,763 B1 | | 2/2003 | Kaufer et al. |
| 6,678,671 B1 | | 1/2004 | Petrovic et al. |
| 6,687,677 B1 | | 2/2004 | Barnard et al. |
| 6,714,915 B1 | | 3/2004 | Barnard et al. |
| 6,993,533 B1 | | 1/2006 | Barnes |
| 7,080,024 B2 | | 7/2006 | Thompson |
| 7,089,193 B2 | | 8/2006 | Newbold |
| 7,139,720 B1 | | 11/2006 | Foell et al. |
| 7,139,999 B2 | | 11/2006 | Bowman-Amuah |
| 7,222,082 B1 | | 5/2007 | Adhikari et al. |
| 7,222,330 B2 | | 5/2007 | Bicknell et al. |
| 7,613,623 B2 | * | 11/2009 | Nemecek et al. ............ 705/7.16 |
| 7,962,358 B1 | * | 6/2011 | Fernandez et al. ........... 705/7.23 |
| 8,001,226 B2 | * | 8/2011 | Matsumoto et al. ......... 709/223 |
| 8,280,756 B1 | * | 10/2012 | Kanemoto et al. ........... 705/7.12 |
| 8,341,591 B1 | * | 12/2012 | Knauth et al. ................ 717/102 |
| 2002/0059512 A1 | * | 5/2002 | Desjardins ........................ 713/1 |
| 2002/0165742 A1 | | 11/2002 | Robins |
| 2003/0018952 A1 | | 1/2003 | Roetzheim |
| 2003/0083891 A1 | * | 5/2003 | Lang et al. ........................ 705/1 |
| 2003/0083912 A1 | * | 5/2003 | Covington et al. ............... 705/7 |
| 2003/0126141 A1 | * | 7/2003 | Hassman et al. ............ 707/100 |
| 2004/0001103 A1 | * | 1/2004 | Fliess et al. ................... 345/810 |
| 2004/0073467 A1 | * | 4/2004 | Heyns et al. ...................... 705/7 |
| 2004/0078254 A1 | | 4/2004 | Piechl et al. |
| 2004/0111306 A1 | | 6/2004 | Yokota et al. |
| 2004/0117046 A1 | | 6/2004 | Colle et al. |
| 2004/0162748 A1 | * | 8/2004 | Vogel et al. ....................... 705/8 |
| 2004/0162749 A1 | * | 8/2004 | Vogel et al. ....................... 705/8 |

(Continued)

OTHER PUBLICATIONS

IBM Rational Portfolio Manager—Product Data Sheet IBM, 2004.*

(Continued)

*Primary Examiner* — Scott L Jarrett

(57) ABSTRACT

As provided, a method of integration of hardware, software and vendor labor in software development pipeline management that comprises providing, for each of multiple projects in a software project pipeline, a set of inputs that includes 1) timing, 2) demand inputs, 3) supply inputs. The method further comprises aggregating the inputs. The method further comprises identifying one or more constraints in the software development pipeline when the demand inputs and the supply inputs are not in balance with the input timing.

19 Claims, 6 Drawing Sheets

(56) References Cited

U.S. PATENT DOCUMENTS

| | | | |
|---|---|---|---|
| 2004/0162753 A1* | 8/2004 | Vogel et al. | 705/10 |
| 2005/0114829 A1 | 5/2005 | Robin et al. | |
| 2005/0114830 A1 | 5/2005 | Knutson et al. | |
| 2005/0120332 A1 | 6/2005 | Martin et al. | |
| 2005/0137920 A1* | 6/2005 | O'Connor et al. | 705/7 |
| 2006/0010418 A1 | 1/2006 | Gupta et al. | |
| 2006/0053043 A1 | 3/2006 | Clarke | |
| 2006/0129439 A1* | 6/2006 | Arlt et al. | 705/7 |
| 2006/0167732 A1* | 7/2006 | Ricketts | 705/8 |
| 2006/0235732 A1 | 10/2006 | Miller et al. | |
| 2007/0006161 A1 | 1/2007 | Kuester et al. | |
| 2007/0073576 A1* | 3/2007 | Connors et al. | 705/10 |
| 2007/0100685 A1* | 5/2007 | Brickhaus et al. | 705/10 |
| 2007/0112945 A1 | 5/2007 | Brown et al. | |
| 2007/0179871 A1 | 8/2007 | Minor et al. | |
| 2008/0110971 A1* | 5/2008 | Pover et al. | 235/375 |
| 2008/0183549 A1* | 7/2008 | Connors et al. | 705/9 |

OTHER PUBLICATIONS

Deltek.com Web Pages—Deltek Project Planner Deltke, Mar. 2002, Retrieved from Archive.org May 18, 2010.*

Wolff, Mario, Project and Project Portfolio Management with SAP SAP, 2002.*

Introduction to Portfolio Management IBM, Rational Software, Sep. 2005.*

Melik, Rudolf et al., Professional Services Automation—Optimizing Project and Service Oriented Organizations John Wiley & Sons, 2002.*

Final Office Action dated Dec. 18, 2009, U.S. Appl. No. 11/403,701, filed Apr. 13, 2006, 16 pgs.

Alsup, Lance A., et al., Patent Application entitled, "Project Estimator", filed Jul. 21, 2006, U.S. Appl. No. 11/491,203.

Deltek—Resource Planning and Project Budgeting Software for Professional Consultants: Wind 2, "Wind2 Resource Scheduling and Budgeting (RSB)," http://www.wind2.com/products/rsb.asp, Oct. 12, 2005, Wind2 Software Inc., 8 pgs.

Heires, James T., et al., What I Did Last Summer: A Software Development Benchmarking Case Study, IEEE Software, Sep./Oct. 2001, pp. 33-39.

Lipner, Steve, "The Trustworthy Computing Security Development Cycle," IEEE Security Conference, Dec. 2004, 12 pages.

Musselman, Kenneth, et al., "The Role of Simulation in Advanced Planning and Scheduling," IEEE Simulation Conference 2002, vol. 2, Dec. 2002, pp. 1825-1830.

Pham, Hoang, et al., "Software Cost Model With Warranty and Risk Costs," IEEE Transactions on Computers, vol. 48, No. 1, Jan. 1999, pp. 71-75.

Office Action dated Sep. 16, 2009, U.S. Appl. No. 11/196,692, filed Aug. 3, 2005, 36 pages.

Office Action dated May 7, 2009, U.S. Appl. No. 11/195,964, filed Aug. 3, 2005, 14 pgs.

Office Action dated Jun. 9, 2009, U.S. Appl. No. 11/403,701, filed Apr. 13, 2006, 16 pgs.

Chapman, C., et al., "Constructively Simple Estimating: A Project Management Example," Oct. 2003, The Journal of the Operational Research Society, vol. 54, No. 10, p. 1052.

Office Action dated Oct. 30, 2009, U.S. Appl. No. 11/195,964, filed Aug. 3, 2005, 19 pgs.

Kanemoto; Michael W., et al., "Milestone Initial Scheduling," Filing Date—Aug. 3, 2005, U.S. Appl. No. 11/196,692, Specification (23 pgs.) and Drawings (3 sheets).

Crum, James L., et al., "Spreading Algorithm for Work and Time Forecasting," Filing Date—Aug. 3, 2005, U.S. Appl. No. 11/195,964, Specification (25 pgs.) and Drawings (4 sheets).

Knauth, Margaret J., et al., "Predictive Growth Burn Rate in Development Pipeline," Filing Date—Apr. 13, 2006, U.S. Appl. No. 11/403,669, Specification (27 pgs.) and Drawings (3 sheets).

Knauth, Margaret J., et al., "A Method and Software Tool for Real-Time Optioning in a Software Development Pipeline," Filing Date—Apr. 13, 2006, U.S. Appl. No. 11/403,773, Specification (32 pgs.) and Drawings (9 sheets).

Knauth, Margaret J., et al., "Project Pipeline Management Systems and Methods Having Capital Expenditure/Expense Flip Targeting," Filing Date—Apr. 13, 2006, U.S. Appl. No. 11/403,701, Specification (31 pgs.) and Drawings (6 sheets).

Office Action dated Mar. 29, 2010, U.S. Appl. No. 11/403,669, filed Apr. 13, 2006, 20 pgs.

Dean, Burton V., et al., "Multiproject Staff Scheduling with Variable Resource Constraints," IEEE Transactions on Engineering Management, vol. 39, No. 1, Feb. 1992, pp. 59-72.

Pfahl, Dietmar, et al., "Integration of System Dynamics Modeling with Descriptive Process Modeling and Goal-Oriented Measurement," The Journal of Systems and Software vol. 46, 1999, pp. 135-150.

Powell, Anthony, et al., "Strategies for Lifecycle Concurrency and Iteration—A System Dynamics Approach," The Journal of Systems and Software, 1999, vol. 46, pp. 151-161.

Final Office Action dated Sep. 14, 2010, U.S. Appl. No. 11/403,669, filed Apr. 13, 2006, 22 pgs.

Office Action dated Aug. 19, 2010, U.S. Appl. No. 11/403,773, filed Apr. 13, 2006, 31 pgs.

Aoyama, Mikio, "Agile Software Process and Its Experience," Department of Information and Electronics Engineering, IEEE, Niigata Institute of Technology, 1998, pp. 3-12.

Chapman, C., et al., "Constructively Simple Estimating: A Project Management Example," Oct. 2003, The Journal of the Operational Research Society, vol. 54, No. 10, p. 1050-1058.

Jandourek, Emil, "A Model for Platform Development," Hewlett-Packard Journal, Aug. 1996, pp. 1-18.

The Free Dictionary, Definition of Rate Equation, Reaction Rate, http://encyclopedia2.thefreedictionary.com/Rate+equation+(chemistry) , 3 pages.

Final Office Action dated Apr. 13, 2010, U.S. Appl. No. 11/196,692, filed Aug. 3, 2005, 47 pages.

Final Office Action dated May 11, 2010, U.S. Appl. No. 11/195,964, filed Aug. 3, 2005, 39 pgs.

Armour, Phillip, "Ten Unmyths of Project Estimation," Communications of the ACM, Nov. 2002, vol. 45. No. 11, 4 pgs.

Office Action dated Jun. 8, 2010, U.S. Appl. No. 11/491,203, filed Jul. 21, 2006, 39 pgs.

Cohen, Morris A., et al., "New Product Development: The Performance and Time-to-Market Tradeoff," Management Science, vol. 42, No. 2, Feb. 1996, 15 pgs.

Advisory Action dated Jun. 28, 2010, U.S. Appl. No. 11/196,692, filed Aug. 3, 2005, 3 pgs.

Advisory Action dated Jul. 22, 2010, U.S. Appl. No. 11/195,964, filed Aug. 3, 2005, 3 pgs.

Examiner's Answer dated Oct. 5, 2010, U.S. Appl. No. 11/403,701, filed Apr. 13, 2006.

Final Office Action dated Oct. 27, 2010, U.S. Appl. No. 11/491,203, filed Jul. 21, 2006.

Advisory Action dated Nov. 24, 2010, U.S. Appl. No. 11/403,669, filed Apr. 13, 2006.

Examiner's Answer dated Jan. 4, 2011, U.S. Appl. No. 11/195,964, filed Aug. 3, 2005.

Advisory Action dated Jan. 6, 2011, U.S. Appl. No. 11/491,203, filed Jul. 21, 2006.

Fox, Mark S., et al. "ISIS—a knowledge-based system for factory scheduling," Expert Systems, vol. 1, No. 1, Jul. 1984.

Final Office Action dated Feb. 9, 2011, U.S. Appl. No. 11/403,773, filed Apr. 13, 2006.

Leffingwell, Dean, et al., "Tactical Management of Agile Development: Achieving Competitive Advantage," Rally Software Development Corporation, 2004.

Rautiainen, Kristian, et al., "4CC: A Framework for Managing Software Product Development," Helsinki University of Technology, Engineering Management Journal, vol. 14, No. 2, Jun. 2002, pp. 27-32.

Smith, Stephen F., et al., "Scheduling and Visualization," Final Technical Report AFRL-IF-RS-TR-2004-142, Jun. 2004, Carnegie Mellon University.

Office Action dated Mar. 29, 2011, U.S. Appl. No. 11/196,692, filed Aug. 3, 2005.

(56) References Cited

OTHER PUBLICATIONS

Final Office Action dated Apr. 27, 2011, U.S. Appl. No. 11/403,773, filed Apr. 13, 2006.
Advisory Action dated Jul. 19, 2011, U.S. Appl. No. 11/403,773, filed Apr. 13, 2006.
Final Office Action dated Oct. 4, 2011, U.S. Appl. No. 11/196,692, filed Aug. 3, 2005.
Examiner's Answer dated Sep. 12, 2011, U.S. Appl. No. 11/491,203, filed Jul. 21, 2006.
Examiner's Answer dated Sep. 21, 2011, U.S. Appl. No. 11/491,203, filed Jul. 21, 2006.
Decision on Appeal dated Jan. 15, 2013, U.S. Appl. No. 11/403,701, filed Apr. 13, 2006.
Bott, M.F., "Software as a Corporate Asset" IEE Proc-Softw. vol. 147, No. 2, Apr. 2, 2000, 6pgs.
Lassila, Ora, et. al., "Toward the Development of Flexible Mixed-Initiative Scheduling Tools", Robotics Institute, Carnegie Mellow University, Mar. 15, 1994, 12 pgs.
Smith-Daniels, Dwight E., et al., "Heuristic Scheduling of Capital Constrained Projects", Journal of Operations Management 14, 1996, 14 pgs.
Ulusoy, Gündüz, et al., "A framework for an interactive project scheduling system under limited resources," European Journal of Operational Research 90, 1996, 14 pgs.
Office Action dated May 9, 2012, U.S. Appl. No. 11/403,773, filed Apr. 13, 2006.
Notice of Allowance dated Jun. 7, 2012, U.S. Appl. No. 11/196,692, filed Aug. 3, 2005.
Notice of Allowance dated Aug. 9, 2012, U.S. Appl. No. 11/403,773, filed Apr. 13, 2006.
Notice of Allowance dated Aug. 12, 2013, U.S. Appl. No. 11/195,964, filed on Aug. 3, 2005.

\* cited by examiner

| PROJECT | START DATE | DEMAND ON PRESENT QUARTER IN HOURS | RELEASE | PRIORITY |
|---|---|---|---|---|
| PROJECT ANDY | 1/10/06 | 300 | 2/15/07 | HIGH |
| PROJECT BOB | 2/5/06 | 200 | 12/31/06 | MEDIUM |
| PROJECT CHRIS | 1/20/06 | 110 | 3/30/06 | LOW |
| PROJECT DAN | 1/5/06 | 150 | 5/31/06 | LOW |
| PROJECT ERIC | 2/25/06 | 300 | 2/15/07 | HIGH |
| PROJECT FRANK | 3/11/06 | 450 | 3/30/06 | HIGH |

HARDWARE/SOFTWARE AND VENDOR LABOR INTEGRATION IN PIPELINE MANAGEMENT

CROSS-REFERENCE TO RELATED APPLICATIONS

This application relates to U.S. patent application Ser. No. 11/195,964, filed Aug. 8, 2005, entitled "Spreading Algorithm for Work and Time Forecasting," by James Crum, et al, which is incorporated herein for reference for all purposes. This application relates to U.S. patent application Ser. No. 11/196,692, filed Aug. 3, 2005, entitled "Milestone Initial Scheduling," by Michael Kanemoto, et al, which is incorporated herein for reference for all purposes. This application relates to U.S. patent application Ser. No. 11/403,701, filed concurrently, entitled "Project Pipeline Management Systems and Methods Having Capital Expenditure/Expense Flip Targeting," by Knauth et al, which is incorporated herein for reference for all purposes. This application relates to U.S. patent application Ser. No. 11/403,773, filed concurrently, entitled "A Method and Software Tool for Real-Time Optioning in a Software Development Pipeline," by Knauth et al, which is incorporated herein for reference for all purposes. This application relates to U.S. patent application Ser. No. 11/403,669, filed concurrently, entitled "Predictive Growth Burn Rate in Development Pipeline," by Knauth et al, which is incorporated herein for reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a business enterprise, a significant number of projects may be underway in parallel (e.g., in a software development pipeline) at any given time. Over time, progress in or completion of each project may have a certain demand in terms of human resources, human skill sets, and various acquisitions. In order to ensure that demand will be met over the course of a given project, managers of individual projects assess what the specific demand is for their own project. In a large enterprise with significant numbers of projects in the software development pipeline, assessing the overall demand and how to meet it is complex. Over time, demand may grow in such a way that it exceeds the available resources, i.e. the supply.

Supply can also vary. For example, available human resources represent one aspect of the supply to meet the above-described demand. The labor supply may comprise individuals grouped in various ways according to the skill sets of each individual. In any enterprise, the supply of human resources, and particularly of valuable skill sets, varies over time as new individuals are hired, existing employees voluntarily leave or are laid off, and individuals come and go from the enterprise as contract workers.

Effectively balancing the demand and the supply of resources necessary for completing projects with any constraints pertaining to the supply, and further optimizing this balance, is a challenging task. Software tools can facilitate the task of assessing and growth planning for supply and demand of resources necessary to project completion.

SUMMARY OF THE INVENTION

According to some embodiments, a software development pipeline timing tool is provided. The tool includes an interface component to accept, for each of multiple projects in a software development pipeline, a set of inputs that for each project includes 1) timing, 2) demand inputs, 3) supply inputs. The tool also includes a feasibility determination component that aggregates the inputs, and identifies one or more constraints in the software development pipeline when the demand inputs and the supply inputs are not in balance with the input timing.

According to some embodiments, a method of integration of hardware, software and vendor labor in software development pipeline management is provided. The method includes providing, for each of multiple projects in a software project pipeline, a set of inputs that includes 1) timing, 2) demand inputs, 3) supply inputs. The method also includes aggregating the inputs, and identifying one or more constraints in the software development pipeline when the demand inputs and the supply inputs are not in balance with the input timing.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following description, taken in connection with the accompanying drawings, wherein like reference numerals represent like parts.

DETAILED DESCRIPTION OF THE PREFERRED EMBODIMENTS

Figure 1:
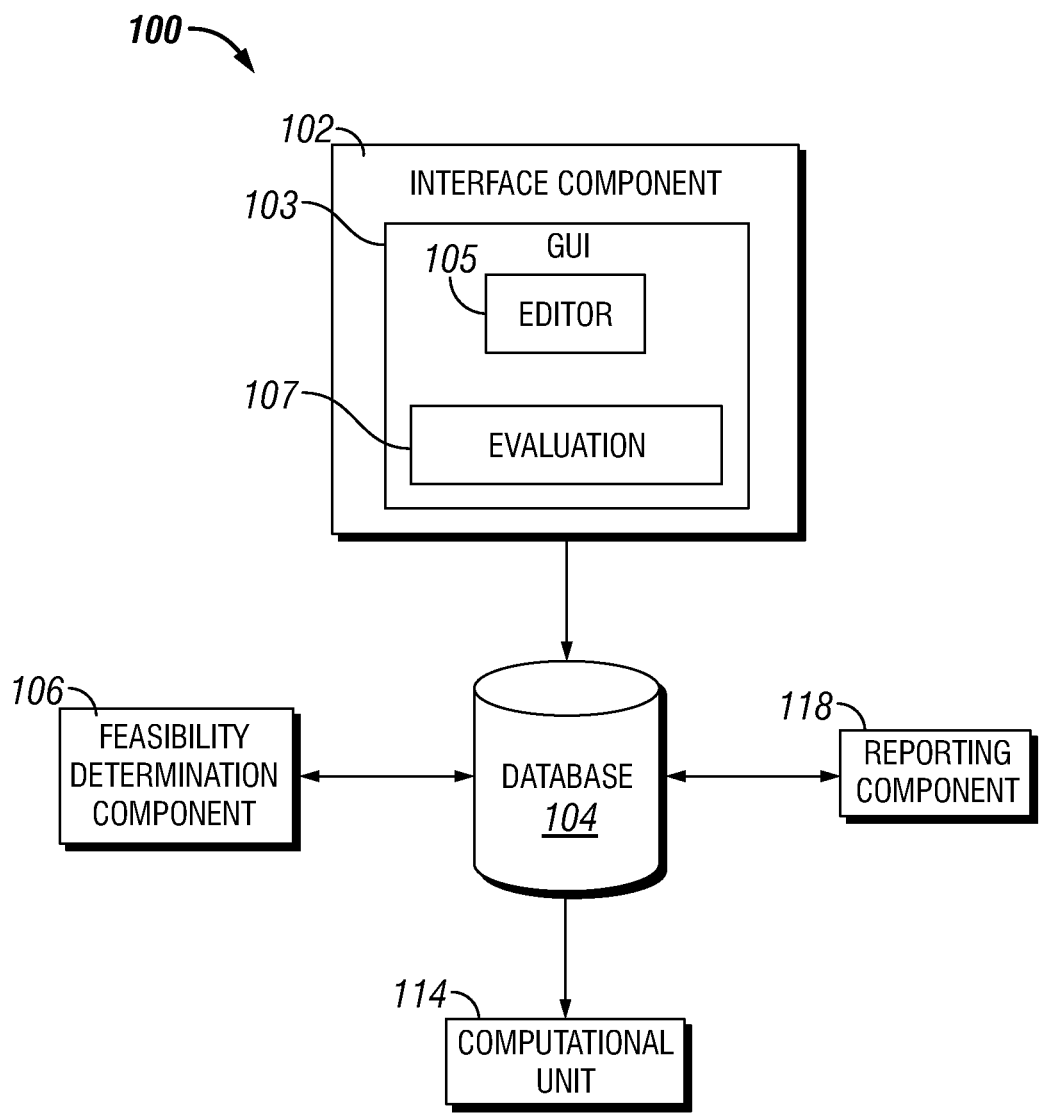
FIG. 1 is a block diagram of a software tool according to various embodiments of the present disclosure.

It should be understood at the outset that although an illustrative implementation of one embodiment of the present disclosure is illustrated below, the present system may be implemented using any number of techniques, whether currently known or not yet in existence. The present disclosure should in no way be limited to the illustrative implementations, drawings, and techniques illustrated below.

The software pipeline planning tools disclosed herein balance the supply and demand of labor but also factor in additional aspects to improve performance. Such aspects include hardware, software and vendor labor. By integrating hardware, software and vendor labor into the software development pipeline, the tool generates a more complete feasibility model which may be used to preemptively handle constraints arising from timing limitations pertaining to labor, hardware, software and vendor labor for the project. Such problems and constraints were previously unforeseen and unaddressed in pure labor supply-demand pipeline tools.

A software development pipeline, as referred to herein, is a long term management tool used for project development for ongoing and planned projects. In various embodiments, the software development pipeline may plan ahead for six financial quarters. For planning purposes in completing projects in a software development pipeline, resources such as labor (i.e. man hours of employees and contractors), vendor labor, hardware, and software give a more accurate assessment of feasibility within timing constraints than merely monitoring whether supply and demand for a project are balanced.

One aspect of supply for the above-described demand is pure labor, as mentioned above. Available vendor labor resources represent an additional aspect of the supply to meet the above-described demand. Pure labor may adequately account for billable and non-billable hours worked internal to the enterprise as well as some out-sourced partner hours. The vendor labor supply, in contrast, may comprise a project or portion of a project that is completely outsourced, such as a piece of code purchased just as any other product is purchased. The available vendor labor resources may be limited by physical timing constraints relating to the individual source of the vendor labor, such as the time necessary for a given vendor to supply the actual vendor labor or end result. Examples of vendor labor may include credit checking systems, billing systems, provisioning systems, and the like which commonly interface with standard third party systems or sets of third party systems. Such systems may be strategically outsourced as functions that are not internally developed or maintained in-house.

Available hardware resources represent still another aspect of the supply to meet the above-described demand. The hardware resources may comprise equipment having a certain cost that may take a certain amount of time to acquire as a new resource or re-allocate from existing resources. The hardware resources may be constrained, for example, by the timeline of when equipment is actually released by its supplier, in the case of new hardware, or by the delayed delivery of a backordered piece of hardware, or special ordered hardware.

Available software resources represent another aspect of the supply to meet the above-described demand. The software resources may comprise a software product that may take a certain amount of time to acquire as a new resource or re-allocate from existing resources. The software resources may be constrained, for example, by the timeline of when product is actually released by its supplier in the case of new software, or when new updates are released, the delay involved in adding special modifications to the software by the vendor for the enterprise or a specific project.

A feasibility model may be defined as an allocation of resources that satisfies the timing constraints and demands for labor, vendor labor, hardware, and software necessary for completing any given project. By generating a feasibility model that aggregates the inputs for the projects in the software development pipeline, individuals involved in managing a business enterprise have a holistic view of ongoing and plans projects in terms of resources needed to complete them, and whether the projects can feasibly be completed within the timing constraints that apply. In various embodiments, a feasibility model may break down according to business units, strategic initiatives or even individual projects, in addition to reflecting the entirety of the software development pipeline.

A method and tool for hardware, software and vendor labor timing threshold integration in software development pipeline management is disclosed. In the example described below, the project is a computer software development project, such as for an enterprise software application.

Referring to FIG. 1, a block diagram of a software development pipeline feasibility modeling tool for integration of hardware, software and vendor labor is shown. The feasibility modeling tool 100 includes an interface component 102, a database component 104, a feasibility determination component 106, and a reporting component 118. In various embodiments, the tool 100 may also include a computational component 114. The interface component 102 additionally includes comprises an editor window 105 and an evaluation window 107. The tool 100 may be implemented in software on a general purpose computer system such as that described in greater detail with respect to FIG. 6 below.

The interface component 102 receives inputs for a project being developed in a software development pipeline. In various embodiments, the inputs include labor demand, vendor labor demand, hardware demand, and software demand for the project. For example, the interface component 102 may receive input of demand units in terms of skill sets and number of hours of time over the course of a given project (for labor). The demand units may be broken down to number of hours of particular skill sets or applications necessary to completion of a given project. For example, individuals who have skill and experience working with a specific application or suite of applications may be in demand for carrying out projects, and demand may be broken down and tracked according to this factor. The demand units may also be broken down to dollars, or units of time for the duration of the project (which may include delays). In various embodiments, the inputs additionally include the timing and availability involved in acquiring a particular hardware, software, or vendor labor resource, referred to herein as timing constraints. The timing constraints are limitations on what is physically feasible and may impact timing. Timing constraints may arise from limitations within the enterprise, or from limitations external to the enterprise, such as those caused by suppliers' availability. By comparison, fiscal constraints are budgetary limitations imposed internally by the enterprise.

In various embodiments, the interface component 102 comprises a graphical user interface (GUI) 103. The graphical user interface (GUI) 103 receives inputs from the user of the tool. The GUI 103 presents, in graphical or textual form, various data to the user of the tool. In various embodiments, the graphical user interface (GUI) 103 further comprises an editor window 105 and an evaluation window 107. The inputs may be obtained via the editor window 105, and the various data, including a software development pipeline model, may be presented via the evaluation window 107. In various embodiments, the user may manually switch between the editor window 105 and the evaluation window 107, or alternatively the tool 100 may autonomously switch between the editor window 105 and the evaluation window 107. In yet other embodiments, the functions of the evaluation window 107 and the editor window 105 may be combined so that, e.g., the evaluation window 107 includes fields for editing input parameters.

In various embodiments, the inputs include one or more known supply timing constraints. For example, supply constraints may include 1) timing constraints on the labor supply, 2) timing constraints on the vendor labor supply 3) timing constraints on the hardware supply, and 4) timing constraints on the software supply. Constraints on the labor supply may include the amount of time necessary to grow the labor supply, such as hiring and training environments that affect the ability of the labor supplier to hire and/or train new employees, and the like. Constraints on the vendor labor supply may include the time necessary for a vendor to hire or train personnel to accomplish the project desired, the time to actually design, build and deliver the project, and the like.

Timing constraints on the hardware supply may include availability of both the product and any necessary licenses, time for a product to be delivered, time before the product is released and the like. Constraints may apply based on each individual supplier, or may be specialized constraints specific to an individual project. Similarly, timing constraints on the software supply may include availability of both the product and any necessary licenses, time for a product to be delivered, time before the product is released and the like. Constraints may apply based on each individual supplier, or may be specialized constraints specific to an individual project.

The database component 104 stores inputs from the interface component 102. In various embodiments, the inputs from the interface component 102 are in a raw data form, and are stored in the database component 104. The database component 104 may also store the results from various other components, as will be discussed further below.

Figures 2, 3:
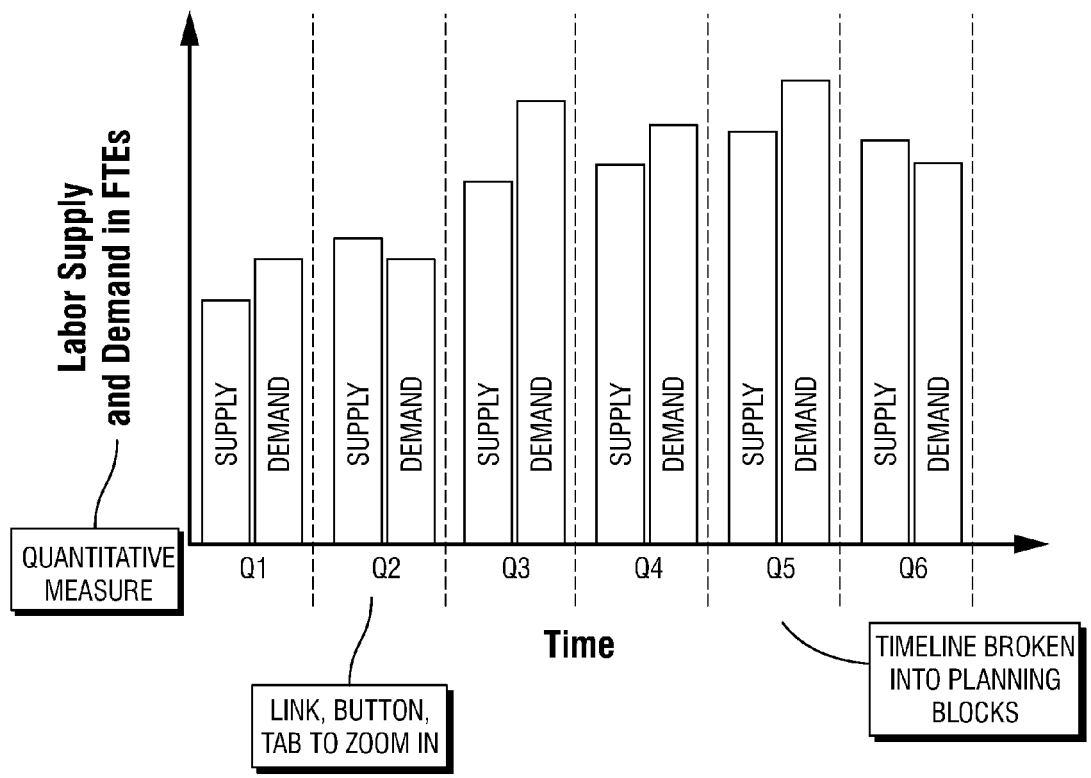
FIG. 2 is an illustrative view of an evaluation window in the GUI that reflects the software development pipeline, in accordance with some embodiments of the present disclosure.
FIG. 3 is an illustrative view of an evaluation window 107 in the GUI 102 providing greater detail to which a user may be transferred from the view of FIG. 2.

FIG. 2 is one illustrative view of an evaluation window 107 in the GUI 102 that reflects the software development pipeline, in an embodiment for six quarter planning. As shown in FIG. 2, the whole software development pipeline, or alternatively a portion of it, may be shown graphically. Along a first axis, a timeline for the planning period is shown, broken into manageable planning blocks, such as, for example, quarters. Each quarter shown may comprise a link, button, tab or the like which may be selected by the user. Along the second axis is a quantitative measure of inputs in the software development pipeline create a graphical representation of the pipeline status. As shown in FIG. 2, the quantitative measure may comprise values for labor supply and labor demand, in units of hours or Full Time Employees ("FTEs"), graphed against time. The quantitative measure may, in various embodiments, reflect greater detail by denoting the percentage of supply and demand that comprises hardware supply/demand, software supply/demand, or vendor labor supply/demand. The growth and decline of labor supply and labor demand may be charted across the planning period. For detail into the trend over time, the user may select a particular quarter or particular balance between supply and demand to zoom into another view.

FIG. 3 is another illustrative view of an evaluation window 107 in the GUI 102 showing a more detailed view to which a user may be transferred from the view of FIG. 2. Specifically, by selecting one of the links for a given quarter, such as Q1 in the view of FIG. 2, the user is transferred to the detailed view of FIG. 3, which lists, graphically or textually, the projects ongoing during the selected quarter and various details pertaining to each. From this view, a particular project may be selected from the list (in a form such as a tab, button, link or the like) in order to edit the selected project or examine it in still greater detail. Additional details pertaining to each project are also displayed, such as, for example, the start date or timing, the demand for the project for the selected quarter, in hours or FTEs, the release date, and the project priority. The displayed details may provide insight to the user regarding the source of meaningful discrepancy between labor supply and labor demand from FIG. 2. If the user can identify, from the details, which project or group of projects may be contributing to the discrepancy between labor supply and labor demand (i.e., where constraints arise), the user may select that project or group of projects (in a link, button, tab or the like) in order to open it in an editor window 105 (such as in FIG. 4). In various embodiments, a color code, bolded text, highlighting or a symbol is displayed in relation to each project from which a constraint arises to identify projects that need user attention or automated changes.

Figure 4:
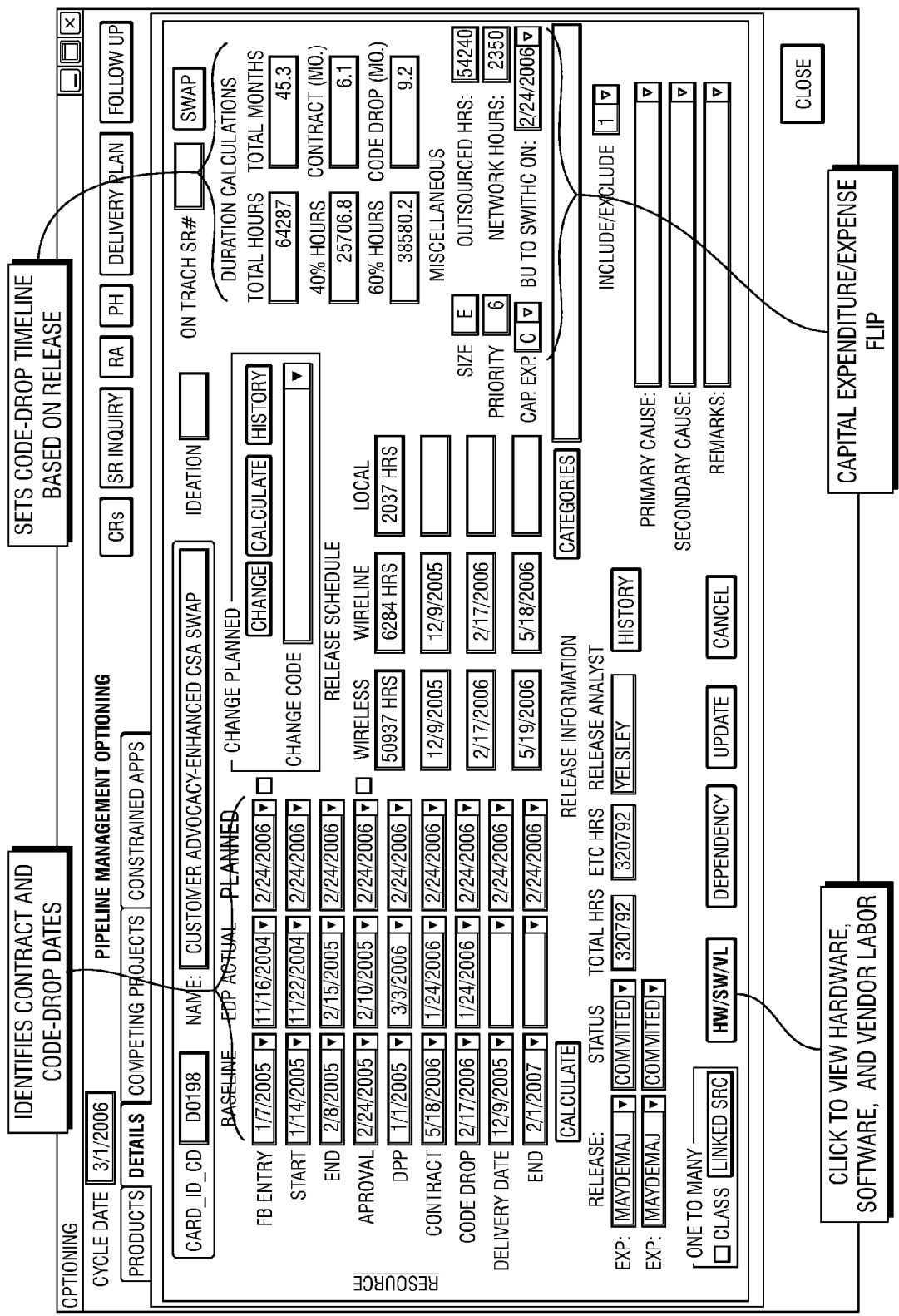
FIG. 4 is an illustrative editor window of the software tool GUI according to some embodiments of the present disclosure.

FIG. 4 is an illustrative view of an editor window 105 in the GUI 102. As seen in FIG. 4, in various embodiments, the user may enter milestone dates which may include target, actual, or planned dates and/or milestones, for example, by entering in a text field, or choosing from a drop-down menu. Such target, actual, or planned dates and/or milestones may include, for example, start dates, approval dates, various contract dates, drop dates, delivery dates, and or warranty dates. The milestone dates may, in various embodiments, identify the contract and code-drop dates for a given project. In various embodiments, the user may additionally enter various release dates and hours of labor anticipated, planned, or actually used, in a release date field (text field or drop-down menu). A project may, in various embodiments, have a release date for different components of the project, such as when a project requires both hardware and software components that are released at specific release times, and which may be similar or different from each other. In various embodiments, in the edit window of the GUI 102, the user may enter a priority for the project, either in a drop-down menu or a text field. In additional text fields or drop-down menus, the user may enter or select various duration calculations that may be used, for example, in tracking progress and for setting the code-drop time-line based on the release (employing, for example, the spreading algorithm disclosed in U.S. patent application Ser. No. 11/195,964, entitled "Spreading Algorithm for Work and Time Forecasting," referenced above). Spreading involves using data relating to consumption schedules to estimate resource consumption in each phase of a task to obtain greater insight into and understanding of future needs, and timing projects such that they are feasible within the limits of available resources, and affordable within the limits of budgets. In still another drop-down menu or text field, the user may enter the timing of a flip from expense to capital expenditure for acquisitions made to complete the project.

Also in the editor window 105 of the GUI 102, the user may select from various views, in some embodiments by selecting a tab or clicking a link, in order to review the whole of the projects in the tool (e.g., back to view of FIG. 2), with a particular project selected, to review any competing or related projects, and for a particular project, any constraints. The user may additionally select from various views, such as a more detailed view of hardware, software, and vendor labor (as can be seen in FIG. 5), or a more detailed view of timing and budgetary factors relating to flip from expense to capital expenditure.

Figure 5:
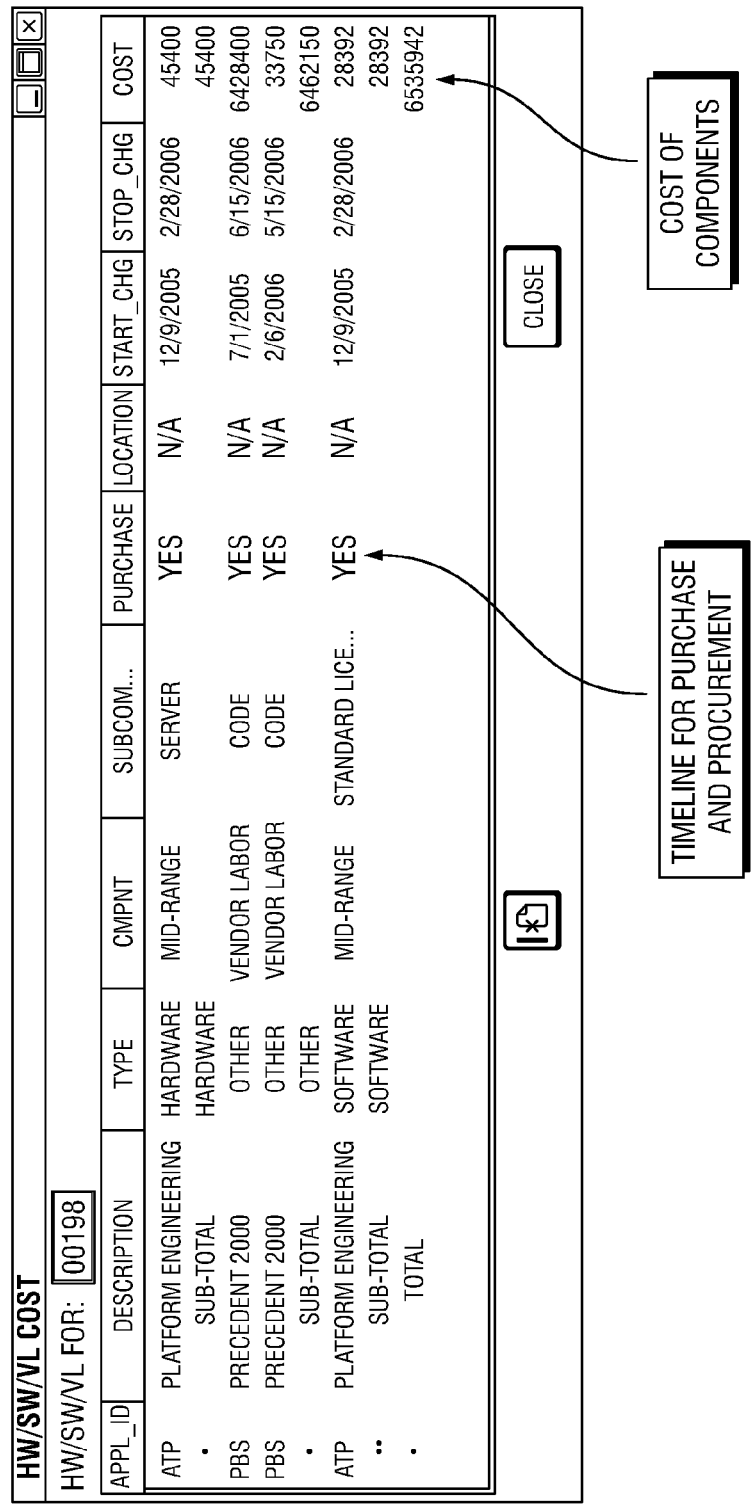
FIG. 5 is an illustrative evaluation window of the software tool GUI according to some embodiments of the present disclosure.

FIG. 5 is an illustrative view of an evaluation window 107 in the GUI 102 for real time optioning. As seen in FIG. 5, in various embodiments, the more detailed view includes details relating to hardware, software and vendor labor acquisitions, including timing and cost. Based on the inputs entered by way of the editor window 105, the evaluation window 107 reflects the identity of one or more items used in completing the selected project. The evaluation window 107 further displays the type of each of the identified items, timing relating to acquisition of each identified items (such as, for example, start and stop dates), and the cost of each item. Such a view in the evaluation window 107 may additionally include, for example, timing of the capital expenditure/expense flip, other timing constraints that arise from other projects, and the interplay of timing for labor with timing and budgeting for the identified items. In various embodiments, when a potential change is entered in the editor window 105, it is reflected in real time in the evaluation window 107 (e.g., in FIG. 2 for whole software development pipeline), as well as in each detailed view of the edited project in the evaluation window 107 (e.g., FIGS. 4 and 5).

The feasibility determination component 106 aggregates the various inputs relating each project in the software development pipeline in order to generate a feasibility model of the balance between the inputs and the various timing constraints over the course of a planning period. The feasibility determination component 106 is a software component or program operable to generate a feasibility model based on the inputs supplied by the user to the GUI 102. In various embodiments, the feasibility model is generated by the feasibility determination component 106 according to methods disclosed in U.S. patent application Ser. No. 11/195,964, filed Aug. 8, 2005, entitled "Spreading Algorithm for Work and Time Forecasting," by James Crum, et al, and U.S. patent application Ser. No. 11/196,692, filed Aug. 3, 2005, entitled "Milestone Initial Scheduling," by Michael Kanemoto, et al, both of which are incorporated herein for reference for all purposes. The feasibility model, in various embodiments, may be represented in a textual view, similar to a large spreadsheet, or may be represented in a graphical view, in order to represent a holistic view oriented to the highest organizational level of planning. From the feasibility model representing the pipeline, individual projects or groups of projects may be selected. In various embodiments, the selection may be performed by clicking a link in a textual view, clicking a graphical representation of the project or projects, choosing a project or projects from a drop-down menu, or the like. By selecting in the feasibility model a project or group of projects, the display transfers to one of various other views for additional detail, such as the editor window 105 or the evaluation window 107.

In various embodiments, the feasibility model extends over six financial quarters for an optimized planning period. The feasibility model aggregating the inputs by the feasibility determination component 106 may permit a user to adjust one or more inputs of supply, demand, or timing constraints, and see the modeled impact of the adjustment before actually implementing a change. The feasibility model may be stored in the database component 104, and updated over time.

The feasibility determination component 106 additionally balances the feasibility model to achieve an optimal alignment of the input in the aggregate, and scheduling of projects in the software development pipeline. Optimization may be performed across the whole enterprise, along business unit or strategic initiative lines, or by groups of projects. In various embodiments, the feasibility determination component 106 incorporates knowledge and business know-how of the user to balance the labor, vendor labor, hardware, and software inputs with the timing constraints. In various embodiments, the feasibility determination component 106 utilizes an algorithm to balance the labor, vendor labor, hardware, and software inputs with the timing constraints by timing projects such that the inputs and timing fall within certain thresholds, which may be predetermined or input by the user.

In various embodiments, the algorithm utilized may comprise the spreading algorithm disclosed in U.S. patent application Ser. No. 11/195,964, filed Aug. 8, 2005, entitled "Spreading Algorithm for Work and Time Forecasting," by James Crum, et al, which is incorporated herein for reference for all purposes. The spreading algorithm method provides for application inclusion and impact type, size of project, wanted start date and end date, and release type and dates (i.e. code-drop, release implementation that affect the inclusion of hardware, software, and vendor labor by setting project lifecycle "end-to-end" success and delivery). When accounted for, certain components such as hardware, software, and vendor labor lead to the establishment of a successful project lifecycle setting based on component purchase and availability. For example, hardware components are purchased after a project has completed the contract phase (per current Sprint process and procurement rules). The purchase and receipt of hardware should be parallel to the planned timeline of the contract, established by the spreading algorithm, and allow time for work that is done in specific phases of a project to coincide with that hardware component's availability.

The inclusion of hardware, software, and vendor labor components does not affect how the technical spreading of project hours is performed, but does directly affect the "end-to-end" success of planning for a project. The same holds true for the availability and procurement of software, and the availability of vendor labor, as predetermined by the vendor contract with the specific project.

In optimization, a change in resource or demand, such as, for example, the availability of a hardware device, may be entered for a single project. Similarly, a change in resource or demand, such as for example, a delay in the release of software, may be entered for a class of like projects, such as all projects occurring during a time frame, all projects sponsored by a particular business unit, and the like. A change such as, for example, a release schedule change, may even be applied to all projects for the enterprise that are ongoing in the software development pipeline.

As stated above, the interface component 102 further comprises in the GUI 103 an evaluation window 107. The evaluation window 107 displays the feasibility model generated by the feasibility determination component 106 over time, constraints that arise in the pipeline model, possible corrective alternatives (i.e., changes that may be implemented to eliminate the constraints, either entered by the user or generated by the feasibility determination component 106 according to a spreading algorithm), reports generated by the reporting component 118 of the tool 100. The reporting component 118 generates reports relating to the scheduling balance between the inputs and timing constraints. In various embodiments, the reporting component 118 generates a coded report, wherein a first code indicates when the number of constraints in the pipeline exceed a threshold number of constraints, a second code indicates when the number of constraints does not exceed the threshold, and a third code indicates the type and timing of each constraint that has arisen, i.e., whether a labor timing constraint, a hardware timing constraint, a software timing constraint, and a vendor labor timing constraint as well as when each constraint arises. In various embodiments, the reporting component 118 generates a report reflecting the amount by which constraints in the project exceeds the various thresholds.

The feasibility determination component 106 refreshes the feasibility model as time passes, new inputs are added and circumstances change, and adjusts the feasibility model in order to balance the various inputs with timing constraints. For example, it may be desirable in various embodiments to adjust either the schedule or the inputs necessary to a project's completion (as opposed to merely suggested or desirable) before making management and planning decisions.

In various embodiments, the tool 100 also optionally includes the computational component 114 that takes raw data from the interface component 102, via the database component 104, and applies a conversion algorithm to convert the raw data into a format useful by the tool 100. In various embodiments, the computational component 114 converts the inputs in hours over time into a number of Full Time Employees ("FTEs") representing the skills and time required by the labor demand. In various embodiments, the computational component 114 is optional, as is the conversion of labor demand to a number of FTEs. Similarly inputs for vendor labor, hardware, and software may be converted from raw dollars and time into a more accurate measure of cost.

The input supply constraints may similarly be converted by the computational component 114, such as labor constraints converted from hours into a number of FTEs with particular associations to enterprise application, capabilities or skill sets, and vendor labor, hardware, and software constraints converted from raw dollars and time into a more accurate measure of cost in terms of time. When inputs are converted, each may be stored in the database component 104.

Figure 6:
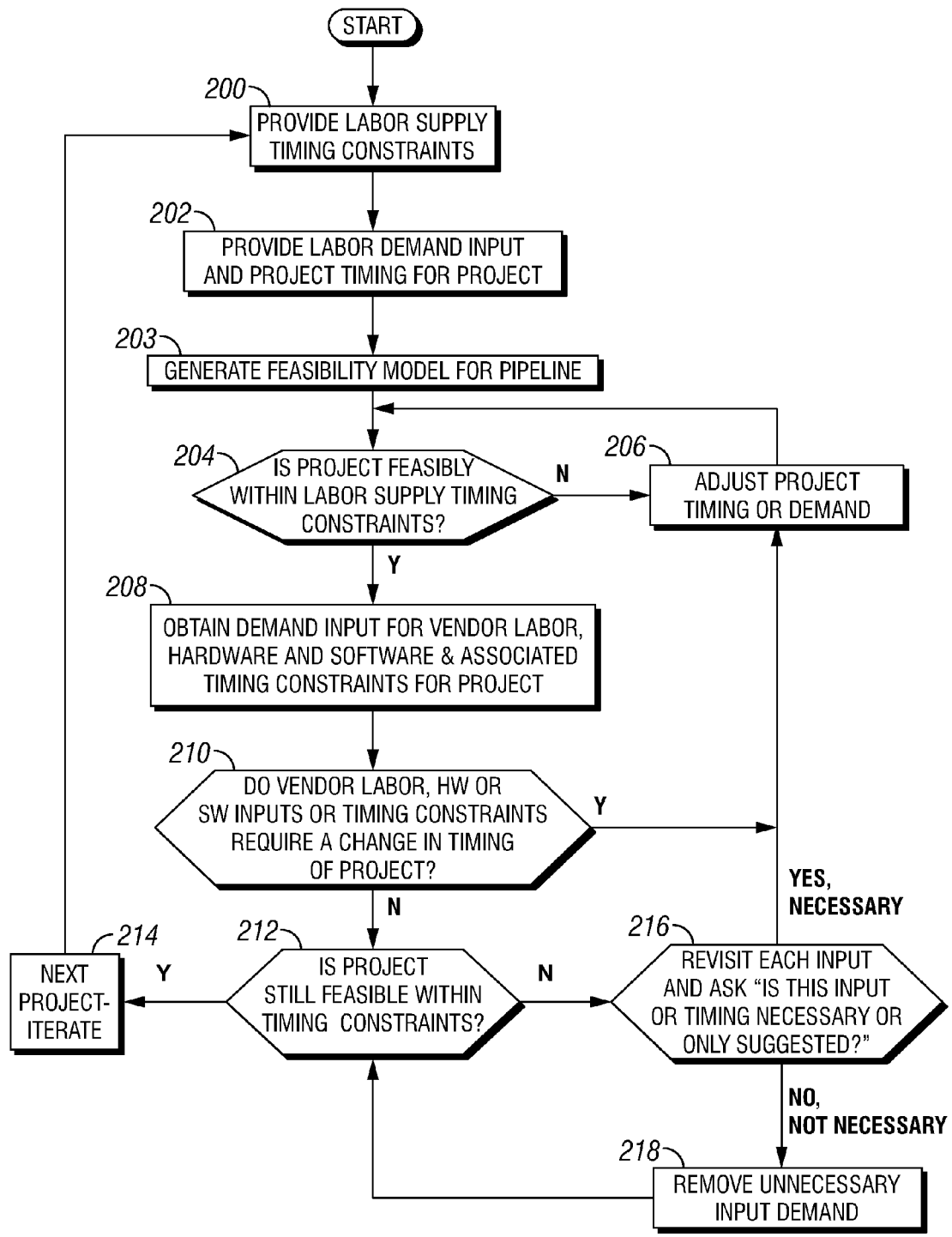
FIG. 6 is a logic flow diagram of a process according to various embodiments of the present disclosure.

Referring to FIG. 6, a flowchart is shown for an illustrative method of integration of labor, vendor labor, hardware and software in software development pipeline management in accordance with various embodiments of the present disclosure. The method begins with a user providing labor supply timing constraints relating to the labor supply to the tool 100 (block 200), reflecting the available labor over time and limitations, such as when the labor supply can or cannot be increased and by how much, at specific points in time. In various embodiments, the timing constraints may affect one or more projects in the software development pipeline, the enterprise as a whole, a given business unit, a strategic initiative, or group of projects. In various embodiments, the constraints pertain to a particular project. The labor demand input for a particular project (i.e. the labor demand reflecting the resources necessary to complete a given project) and the project timing are also provided to the tool 100 (block 202).

With the inputs, the feasibility determination component 106 generates a feasibility model for analysis of whether the project is feasible for completion as timed (block 203). In the analysis, the question "Is the project feasible within the timing constraints?" is asked and analyzed (block 204). Specifically, the project is checked to see if it is feasible to complete, as timed, with the labor supply timing constraints. In various embodiments, the check of the project's feasibility (in block 204) is done at various levels, including enterprise-wide, along business unit lines, along lines of strategic initiative, and along the groupings of various groups of projects. If the project is not feasible as timed, i.e., with the timing as-is, the project cannot be accomplished with the labor supply available at the scheduled time, the tool adjusts the project timing or demand input for labor (provided in block 202) in order to work the project out within the timing constraints (block 206), i.e., adjust the project to time it with the labor supply fluctuations such that the project is feasible to accomplish. For example, if a project is beyond the labor supply timing constraints for a certain release date, adjusting the project to complete it earlier or later may be enough adjustment to enable the project to be accomplished as scheduled within the timing constraints. The adjustment by the tool may be accomplished according to the feasibility determination component algorithm or a user suggested entry.

If the project is feasible within the timing constraints at block 204, the tool 100 obtains the demand inputs in terms of vendor labor, hardware, and software for the project as well as the associated timing constraints relating to the vendor labor, the hardware, and the software (block 208). These demand inputs reflect additional resources necessary to complete the given project and any constraint for each input that could affect the feasibility of completing the project on time.

Proceeding with the analysis, the tool asks and analyzes the question "Do the vendor labor, hardware, or software demands or timing constraints require a change the timing of the project?" (block 210). If the vendor labor, hardware and/or software demands or timing constraints do require a change in the timing, such as, for example, delaying until a hardware device is delivered or re-allocated from another project or delaying until software is released, then the tool 100 adjusts the project timing or demand input for vendor labor, hardware, and/or software (provided in block 208) in order to complete the project on time (block 206). The adjustment of block 206 may be performed according to the feasibility determination component algorithm or user suggested entry.

If the timing constraints associated with the vendor labor, the hardware and/or the software demands do not require a change in the timing, then the method proceeds with the analysis by asking and analyzing the question "Is the project still feasible within the timing constraints?" (block 212). In various embodiments, the check of the project's feasibility (in block 212) is done at various levels, including enterprise-wide, along business unit lines, along lines of strategic initiative, and along the groupings of various groups of projects.

If the project is still feasible within the timing constraints (given the labor supply inputs and the added inputs of vendor labor, hardware, and software), then the method may proceed to iterate the process for any number of other projects in the software development pipeline (block 214). If the project is no longer feasible within the timing constraints (given the labor supply inputs and the added inputs of vendor labor, hardware, and software and the associated timing constraints), then the tool 100 may proceed by revisiting each input, and asking and analyzing the question "is this input necessary or merely suggested or desired?" (block 216). Such analysis gives greater weight to whether the project is classified as a high enough priority to keep as-is or if some degree of change would be acceptable. For each input that, upon further consideration, is not necessary, the input demand may be removed or decreased accordingly (block 218), and the method may re-assess the question "is the project feasible within the timing constraints?" (block 212). For each input that, upon further consideration, is determined to be necessary, the method proceeds to adjusting the project timing or labor demand (block 206), in order to alter the project timing and/or demand for resources in order to adjust it into an acceptable feasibility model. In this fashion, the process iterates until projects are feasible and optimized.

In various embodiments, the tool and process described above may further analyze additional constraints, such as fiscal limitations, in addition to timing constraints. For example, a project may not be feasible within the timing constraints because of a fiscal constraint such as, for example, the point in time when the costs associated with a hardware or software resource flip from expense to capital expenditure, or other budgetary constraints. Tying in fiscal limitations, having to do with when budgetary limitations imposed with the business enterprise, adds another layer of analysis analogous to that described above, and provides the opportunity for further optimization of the software development pipeline.

Figure 7:
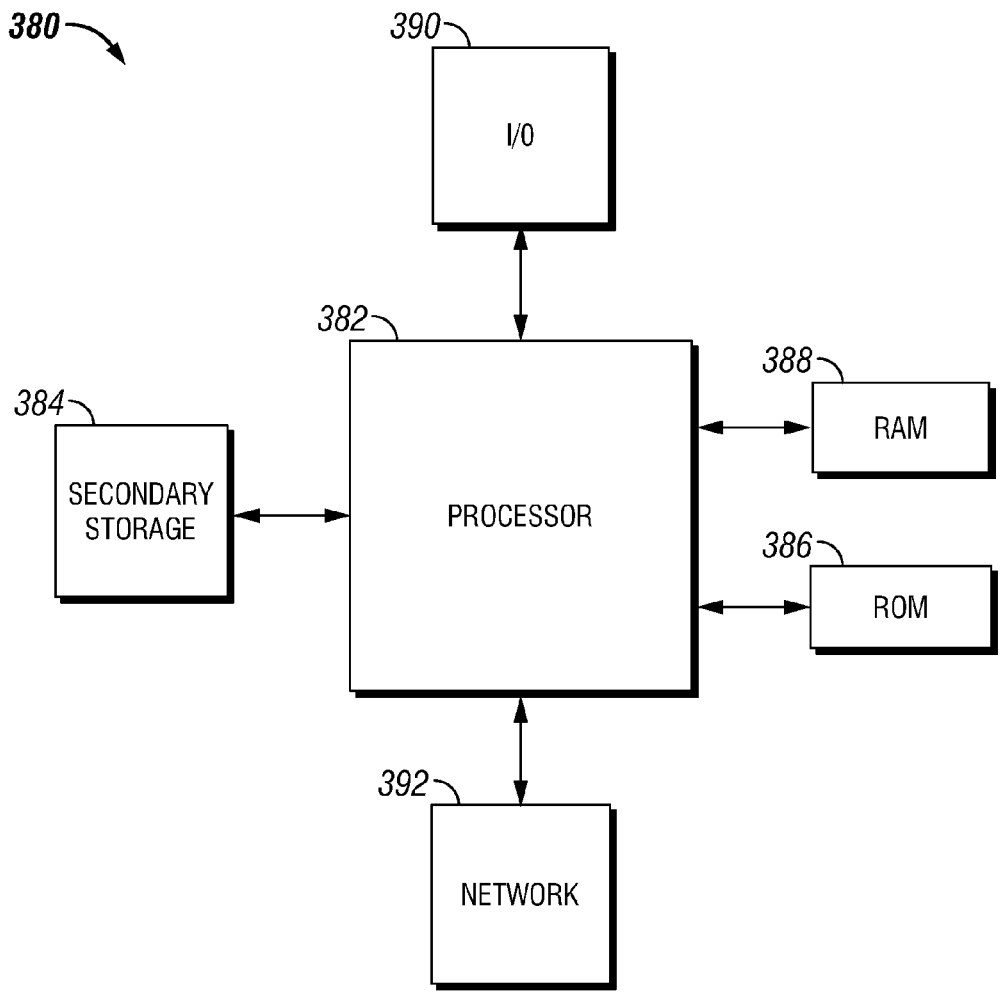
FIG. 7 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 7 illustrates a general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which has a small memory capacity relative to the larger memory capacity of secondary storage. The RAM 388 is used to store volatile data and perhaps to store instructions. Access to both ROM 386 and RAM 388 is faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments, as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A software development pipeline timing tool that comprises:
    an interface component stored on a non-transitory computer-readable medium and executable by a computer to accept, for each of multiple projects in a software development pipeline, a set of inputs that for each project includes 1) timing constraints, 2) demand inputs, 3) supply inputs, wherein timing constraints include timing of availability of hardware, software, and vendor labor, demand inputs include enterprise labor demand for the project, vendor labor demand for the project, hardware demand, and software demand, and wherein supply constraints include enterprise labor supply, vendor labor supply, hardware supply, and software supply;
    a feasibility determination component stored on a non-transitory computer-readable medium and executable by a computer to aggregate the inputs and timing constraints, and identify one or more discrepancies between the supply and demand in the software development pipeline when the demand inputs and the supply inputs are not in balance with the input timing constraints; and
    a reporting component that generates a coded report, wherein a first code indicates when the number of discrepancies exceeds a threshold number of discrepancies, a second code indicates when the number of discrepancies does not exceed the threshold number of discrepancies, and a third code indicates a type and timing of each discrepancy.

2. The tool of claim 1, wherein the feasibility determination component notifies a user of the identified discrepancies when the number of discrepancies exceeds the threshold number of discrepancies.

3. The tool of claim 1, wherein the feasibility determination component determines a project in which a discrepancy arises, and wherein the feasibility determination component alters the timing of the project in order to balance the demand inputs and the supply inputs, thereby eliminating the discrepancy.

4. The tool of claim 1, wherein the feasibility determination component determines a project in which a discrepancy arises, and wherein the feasibility determination component reallocates units of supply inputs to the project in order to balance the demand inputs and the supply inputs, thereby eliminating the discrepancy.

5. The tool of claim 1, wherein the feasibility determination component determines a project in which a discrepancy arises, and wherein the feasibility determination component reassesses priority for the demand units, and adjusts the demand units that are not high priority in order to balance the demand inputs and the supply inputs, thereby eliminating the discrepancy.

6. The tool of claim 1, wherein the feasibility determination component applies a spreading algorithm that generates project timing for the projects in the software pipeline such that the supply inputs and demand inputs are balanced as timed.

7. The tool of claim 1, further comprising a computational component that applies an algorithm to normalize the inputs to a common format.

8. The tool of claim 1, wherein the set of inputs for each project includes budgetary constraints.

9. The tool of claim 1, wherein the feasibility determination component is configured to selectively break down feasibility modeling for all projects of the software development pipeline, for all projects of a business unit, for all projects of a strategic initiative, and for an individual project.

10. A method of integration of hardware, software and vendor labor in software development pipeline management that comprises:
- providing, by an interface component stored on a non-transitory computer-readable medium and executing by a processor, for each of multiple projects in a software development pipeline, a set of inputs that includes 1) timing, 2) demand inputs, 3) supply inputs, wherein timing constraints include timing of availability of hardware, software, and vendor labor, demand constraints include enterprise labor demand, vendor labor demand, hardware demand, and software demand, and wherein supply constraints include enterprise labor supply, vendor labor supply, hardware supply, and software supply;
- aggregating, by a feasibility determination component stored on a non-transitory computer-readable medium and executing by a processor, the inputs and timing constraints;
- identifying, by the feasibility determination component, one or more discrepancies between the supply and demand in the software development pipeline when the demand inputs and the supply inputs are not in balance with the input timing; and
- generating a coded report wherein a first code indicates when the number of discrepancies exceeds a threshold number of discrepancies, and wherein a second code indicates when the number of discrepancies does not exceed the threshold number of discrepancies.

11. The method of claim 10, further comprising notifying a user of the identified discrepancies when the number of discrepancies exceeds the threshold number of discrepancies.

12. The method of claim 10, further comprising determining a project in which a discrepancy arises, and altering the timing of the project in order to balance the demand inputs and the supply inputs, thereby eliminating the discrepancy.

13. The method of claim 10, further comprising determining a project in which a discrepancy arises, and reallocating units of supply inputs to the project in order to balance the demand inputs and the supply inputs, thereby eliminating the discrepancy.

14. The method of claim 10, further comprising determining a project in which a discrepancy arises, and reassessing priority for the demand units, and adjusts the demand units that are not high priority in order to balance the demand inputs and the supply inputs, thereby eliminating the discrepancy.

15. The method of claim 10, further comprising generating one or more corrective alternatives for eliminating a discrepancy, presenting the corrective alternatives to a user, and implementing those of the corrective alternatives that are selected by the user.

16. The method of claim 10, further comprising generating one or more corrective alternatives for eliminating a discrepancy, autonomously without direction from a user implementing the corrective alternatives, and notifying the user of implemented corrective alternatives.

17. The method of claim 10, further comprising applying a spreading algorithm that generates project timing for the projects in the software pipeline such that the supply inputs balance the demand inputs as timed.

18. The method of claim 10 further comprising providing budgetary constraints for each project.

19. The method of claim 10 further comprising selectively breaking down feasibility modeling for all projects of the software development pipeline, for all projects of a business unit, for all projects of a strategic initiative, and for an individual project.

* * * * *